May 26, 1942.  H. A. KNOX  2,283,936
TRACK FOR TRACK-LAYING VEHICLES
Filed Dec. 9, 1940
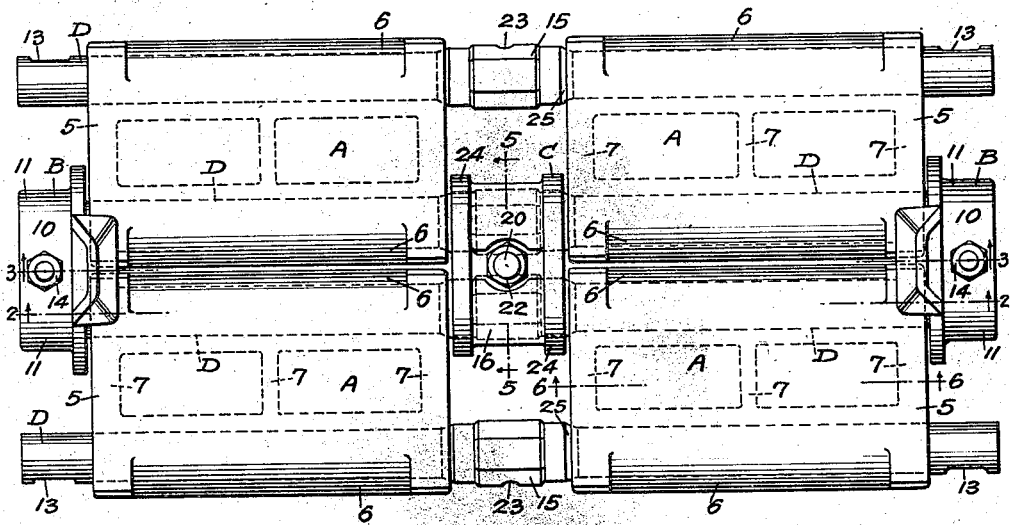
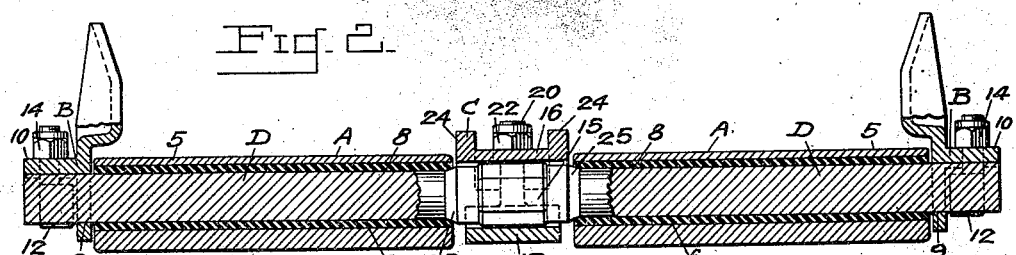
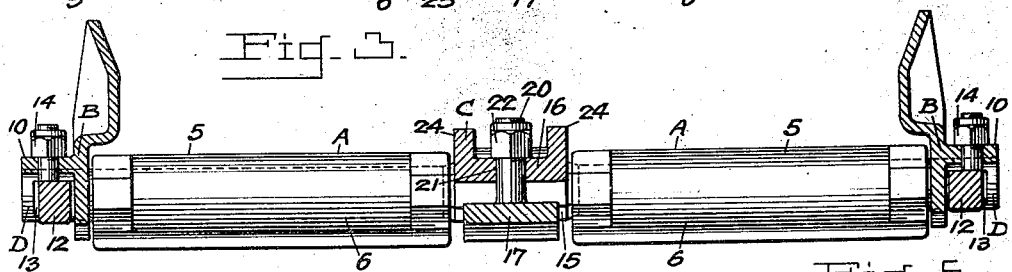
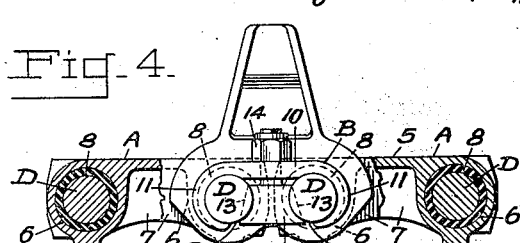
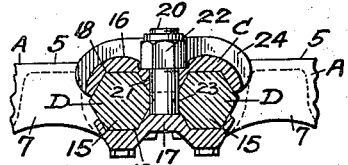
INVENTOR
Harry A. Knox
BY
ATTORNEYS Patented May 26, 1942

2,283,936

UNITED STATES PATENT OFFICE 2,283,936

TRACK FOR TRACK-LAYING VEHICLES

Harry A. Knox, Washington, D. C.

Application December 9, 1940, Serial No. 369,272

9 Claims. (Cl. 305—10)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a track for a track-laying vehicle.

The purpose of the invention is to provide a wide track for heavy vehicles which adapts for a particular purpose some of the features of the narrow tracks for light vehicles shown in my prior U. S. Patents Nos. 2,008,214 and 2,039,210.

The specific nature of the invention as well as other objects and advantages thereof will clearly appear from a description of a preferred embodiment as shown in the accompanying drawing in which:

Fig. 1 is an inside plan view of a portion of the improved track;

Figs. 2 and 3 are sectional views on the corresponding lines of Fig. 1;

Fig. 4 is a view in side elevation with parts broken away;

Fig. 5 is a sectional view on the line 5—5 of Fig. 1;

Fig. 6 is a sectional view of a shoe on the line 6—6 of Fig. 1.

Referring to the drawing by characters of reference, the track comprises a double row of shoes A connected in spaced relation by means of side links B and center links C mounted on link pins D.

The shoes are all identical and each one consists of a metal body 5 forming a flat rail surface for the wheels of the vehicle and joining a pair of spaced bearings 6—6 extending transversely of the track. A plurality of longitudinally disposed strengthening webs 7 are provided on the ground side of the body.

The link pins D are of sufficient length to mount the double row of shoes and project therefrom and each pin is provided with a pair of rubber bushings 8—8 which are preferably vulcanized thereto and press-fitted in the bearings.

The side links B are similar to the links of the patents previously referred to and each has a pair of apertures 9—9 for receiving the ends of adjacent link pins of longitudinally adjacent shoes. The outer side of each link has a laterally projecting flange 10 with turned ends 11 adapted to hook over the link pins. A bolt insertable between the link pins has a wedge-shaped head 12 receivable in grooves or slots 13 of the pins. The shank of the bolt passes through the flange 10 and a nut 14 is applied to the bolt and bears against the flange. This connection holds the link in place and locks the associated link pins against independent rotational movement.

While the portions of the link pins which carry the rubber bushings are preferably circular in cross-section they may be of other shapes. The central portion 15 of each link pin is preferably non-circular in cross-section, for example hexagonal, for mounting the center link C. The links C are all identical and each one is in the form of a clamp consisting of an upper plate 16 and a lower plate 17 having opposed inner faces, respectively 18 and 19 corresponding in shape to the non-circular central portion 15 of the link pin. One of the plates, preferably the lower plate 17 carries a bolt 20 which extends through an aperture 21 in the upper plate and receives a nut 22. The bolt is interposed between a pair of adjacent link pins and fits in a groove 23 of each pin to prevent relative axial displacement of the pins.

The upper plate is formed with side flanges 24 serving as wheel guides. The upper surface of the upper plate is rounded so that it may constitute a driving lug for engagement by the sprocket of the vehicle. The flange 10 of the side links serves in a similar capacity.

The edges of the hexagonal central portion of each link pin are cut away as at 25 to provide a diameter less than the internal diameter of the bearings 6 of the shoe 5. This provision is made so that in assembling a shoe on the link pin prior to application of the center link, the shoe may temporarily override the central portion. This is necessary because of the elastic character of the bushing 8.

I claim:

1. In a track for track-laying vehicles, a series of laterally spaced pairs of shoes, each shoe comprising a body joining a pair of bearings extending transversely of the track, a circular cross sectioned link pin extending through the bearings of a pair of laterally spaced shoes and projecting therefrom, each link pin having a central portion having a non-circular cross sectional area which is larger than the circular cross sectional area, said central portion having a groove in one edge and having edges cut away to provide a diameter less than the internal diameter of the bearings, resilient bushings fast on each link pin and engaging the bearings, a centrally disposed link for connecting adjacent link pins of adjacent shoes, each link consisting of a pair of plates for engaging the central portion of the link pin, a bolt on one plate interposed between link pins and fitting in the grooves thereof, means for clamping the bolt to the other plate, said last mentioned plate having wheel guides and a surface adapted to be engaged by a track propelling sprocket, links connecting the projecting ends of adjacent link pins of adjacent shoes, said last mentioned link having a surface adapted to be engaged by a track propelling sprocket, and a wheel guide on the last mentioned link.

2. In a track for track-laying vehicles, a series of laterally spaced pairs of shoes, each shoe comprising a body joining a pair of bearings extending transversely of the track, a circular cross sectional link pin extending through the bearings of a pair of laterally spaced shoes and projecting therefrom, each link pin having a central portion having a non-circular cross sectional area which is larger than the circular cross sectional area, said central portion having a groove in one edge, resilient bushings fast on each link pin and engaging the bearings, a centrally disposed link for connecting adjacent link pins of adjacent shoes, each link consisting of a pair of plates for engaging the central portion of the link pin, a bolt on one plate interposed between link pins and fitting in the grooves thereof, means for clamping the bolt to the other plate, said last mentioned plate having wheel guides and a surface adapted to be engaged by a track propelling sprocket, links connecting the projecting ends of adjacent link pins of adjacent shoes, said last mentioned link having a surface adapted to be engaged by a track propelling sprocket, and a wheel guide on the last mentioned link.

3. In a track for track-laying vehicles, a series of laterally spaced pairs of shoes, each shoe comprising a a body joining a pair of bearings extending transversely of the track, a circular cross sectional link pin extending through the bearings of a pair of laterally spaced shoes and projecting therefrom, each link pin having a central portion having a non-circular cross sectional area which is larger than the circular cross sectional area, resilient bushings fast on each link pin and engaging the bearings, a link for connecting adjacent link pins of adjacent shoes, each link consisting of a pair of plates for engaging the central portion of the link pin, means separating the link pins for clamping the plates to the link pins, links connecting the projecting ends of adjacent link pins of adjacent shoes, said last mentioned link having a surface adapted to be engaged by a track propelling sprocket, and a wheel guide on the last mentioned link.

4. In a track for track-laying vehicles, a series of laterally spaced pairs of shoes, each shoe comprising a body joining a pair of bearings extending transversely of the track, a circular cross sectional link pin extending through the bearings of a pair of laterally spaced shoes and projecting therefrom, each link pin having a central portion having a non-circular cross sectional area which is larger than the circular cross sectional area, resilient bushings fast on each link pin and engaging the bearings, a link for connecting adjacent link pins of adjacent shoes, each link consisting of a pair of plates for engaging the central portion of the link pin, means for clamping the plates to the link pins, links connecting the projecting ends of adjacent link pins of adjacent shoes, said last mentioned link having a surface adapted to be engaged by a track propelling sprocket, and a wheel guide on the last mentioned link.

5. In a track for track laying vehicles of the type wherein adjoining link pins in adjoining shoes are locked against independent rotational movement, a clamp for locking together a pair of adjoining link pins having a hexagonal cross section comprising, a substantially T-shaped member having indentations in each of the horizontal portions of the T adapted to receive substantially one-half the cross sectional area of one of the hexagonal pins, a cooperating member having indentations therein adapted to receive substantially the other half of the cross sectional area of the pair of hexagonal pins and having an aperture for the passage of the vertical portion of the T-shaped member, means for fastening the cooperating member to the T-shaped member, and each one of said pair of pins having a groove therein which partially encircles the vertical portion.

6. In a track for track laying vehicles, a series of laterally spaced pairs of shoes, each shoe comprising a body joining a pair of bearings extending transversely of the track, a link pin extending through the bearings of a pair of laterally spaced shoes and projecting therefrom, each link pin having an enlarged central non-circular portion, resilient bushings fast on each link pin and engaging the bearings, a link for connecting adjacent link pins of adjacent shoes, each link consisting of a pair of plates for engaging the central portion of the link pin, means for clamping the plates to the link pins, links connecting the projecting ends of adjacent link pins of adjacent shoes, said last mentioned link having a surface adapted to be engaged by a track propelling sprocket, and a wheel guide on the last mentioned link.

7. In a track for track laying vehicles of the type wherein adjoining link pins in adjoining shoes are locked against independent rotational movement, a clamp for locking together a pair of adjoining link pins having a hexagonal cross section comprising, a substantially T-shaped member having indentations in each of the horizontal portions of the T adapted to receive substantially one-half the cross sectional area of one of the hexagonal pins, a cooperating member having indentations therein adapted to receive substantially the other half of the cross sectional area of the pair of hexagonal pins and having an aperture for the passage of the vertical portion of the T-shaped member, means for fastening the cooperating member to the T-shaped member, said cooperating member having a surface adapted to be engaged by a sprocket wheel, and a wheel guide on the cooperating member.

8. In a track for track laying vehicles of the type wherein adjoining link pins in adjoining shoes are locked against independent rotational movement, a clamp for locking together a pair of adjoining link pins having a non-circular cross section comprising, a substantially T-shaped member having indentations in each of the horizontal portions of the T adapted to receive substantially one-half the cross sectional area of one of the non-circular pins, a cooperating member having indentations therein adapted to receive substantially the other half of the cross sectional area of the pair of non-circular pins and having an aperture for the passage of the vertical portion of the T-shaped member, means for fastening the T-shaped member to the cooperating member, and each one of the pair of non-circular pins has a groove which allows passage for the vertical portion of the T-shaped member.

9. In a track for track laying vehicles of the type wherein adjoining link pins in adjoining shoes are locked against independent rotational movement, a clamp for locking together a pair of adjoining link pins having a non-circular cross section comprising, a substantially T-shaped member having indentations in each of the horizontal portions of the T adapted to receive substantially one-half the cross sectional area of one of the non-circular pins, a cooperating member having indentations therein adapted to receive substantially the other half of the cross sectional area of the pair of non-circular pins and having an aperture for the passage of the vertical portion of the T-shaped member, means for fastening the T-shaped member to the cooperating member and the cooperating member has a surface adapted to be engaged by a sprocket wheel, and a wheel guide on the cooperating member.

HARRY A. KNOX.